United States Patent [19]

Acampora et al.

[11] 4,163,942

[45] Aug. 7, 1979

[54] METHOD AND APPARATUS FOR EFFECTING COMMUNICATION WITH RECEIVERS DISPOSED IN BLACKOUT REGIONS FORMED BY CONCURRENTLY TRANSMITTED OVERLAPPING GLOBAL AND SPOT BEAMS

[75] Inventors: Anthony Acampora, Freehold; Douglas O. Reudink, Sea Girt; Yu S. Yeh, Freehold Township, Monmouth County., all of N.J.

[73] Assignee: Bell Telephone Laboratories, Incorporated, Murray Hill, N.J.

[21] Appl. No.: 842,416

[22] Filed: Oct. 17, 1977

[51] Int. Cl.[2] .................. H04B 15/00; H04B 1/00
[52] U.S. Cl. ........................... 325/52; 325/65; 343/100 ST; 343/207
[58] Field of Search ............ 325/4, 41, 42, 43, 65, 325/67, 115, 52, 139, 132, 156, 344, 158; 343/100 CS, 100 ST, 201, 202, 203, 205, 206, 207, 208; 340/146.1 BE; 179/15 R, 15 AE

[56] References Cited

U.S. PATENT DOCUMENTS

| | | | |
|---|---|---|---|
| 2,579,882 | 12/1951 | Thompson | 325/41 |
| 3,094,695 | 6/1963 | Jahn | 343/100 ST |
| 3,205,443 | 9/1965 | Ludwig | 325/344 |
| 3,710,255 | 1/1973 | Gicca | 325/4 |
| 3,987,444 | 10/1976 | Masak et al. | 343/100 ST |

Primary Examiner—Benedict V. Safourek
Assistant Examiner—Tommy P. Chin
Attorney, Agent, or Firm—Erwin W. Pfeifle

[57] ABSTRACT

The present invention relates to method and apparatus for communicating with one or more receiver stations disposed within a blackout region located in the vicinity of and surrounding each spot beam coverage area, the blackout region being caused by interference between concurrently transmitted and overlapping global coverage and spot coverage antenna radiated beams using the same frequency band despite the application of global beam interference suppression techniques at the spot beam receiving areas. Access to the receiver stations within each blackout region is provided by selectively turning off the associated interfering spot beam during a predetermined interval of time while ensuring that the power level of the radiated global coverage beam is not suppressed within the accessed blackout region to permit the global coverage beam to communicate with these receiver stations.

14 Claims, 5 Drawing Figures

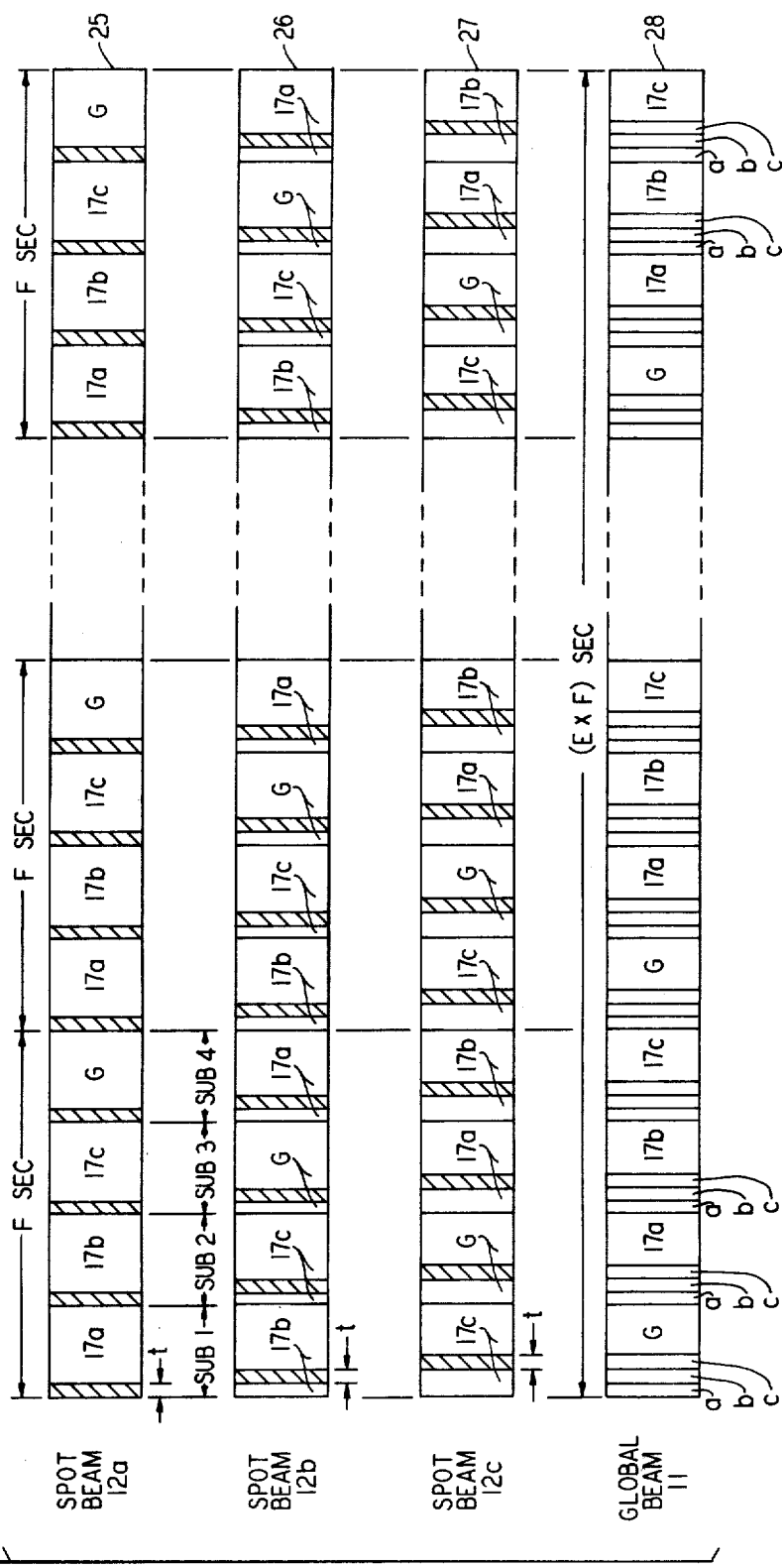

4,163,942

METHOD AND APPARATUS FOR EFFECTING COMMUNICATION WITH RECEIVERS DISPOSED IN BLACKOUT REGIONS FORMED BY CONCURRENTLY TRANSMITTED OVERLAPPING GLOBAL AND SPOT BEAMS

BACKGROUND OF THE INVENTION

1. Field of the Invention

The present invention relates to method and apparatus for communicating with one or more receiver stations disposed within a blackout region located in the vicinity of and surrounding each spot beam coverage area, the blackout region being caused by interference between concurrently transmitted and overlapping global coverage and spot coverage antenna radiated beams using the same frequency band. More particularly, this invention relates to method and apparatus for communicating with the one or more receiver stations disposed within the above-mentioned blackout region by selectively turning off the associated interfering spot beam during the predetermined interval of time to permit the global beam to communicate with the normally blacked out receivers.

2. Description of the Prior Art

It is most desirable in a domestic satellite communications system to have a coexistence of overlapping spot and global coverage beams. For each high traffic ground station, for example, a separate spot coverage beam can be used for communication therebetween. Alternately, communication between the satellite and a plurality of low traffic ground stations can be accomplished with an overlapping global coverage beam where it might not be desirable to interconnect the individual low traffic ground stations to the nearest high traffic ground station for access to the satellite system. However, signals transmitted in the global beam cause interference in the spot beam signals and, therefore, to acquire an optimum signal in spot beam coverage area, various prior art interference suppression techniques may be employed.

To avoid signal degradation and permit separation of the overlapping spot coverage and global coverage beams, separate bandwidths or polarizations for the spot coverage beams and the global coverage beam can be used. Using separate bandwidths, however, results in inefficient use of the frequency spectrum and different polarizations may not be available where dual polarization is already used by each of the beams of the satellite system. In addition, substantial reduction of the interference between the overlapping global and spot coverage beams can be achieved, for example, through the use of antenna pattern shaping or channel coding techniques. More specifically, both antenna pattern shaping and channel coding techniques substantially remove interference in the spot beam coverage areas and dramatically reduce the area of interference in the vicinity of and surrounding these areas. However, neither prior art technique completely removes the interference in the area in the vicinity of and surrounding each of the spot beam coverage areas and, in fact, an area often termed "a blackout region" is produced within the above-mentioned area where signal separation between the two overlapping beams becomes virtually impossible without the use of highly sophisticated circuitry.

Numerous other techniques have been devised to suppress interference particularly between two beams arriving at a receiver from separate directions. In this regard, see for instance, U.S. Pat. Nos. 2,579,882 issued to L. E. Thompson on Dec. 25, 1951; 3,094,695 issued to D. M. Jahn on June 18, 1963; 3,205,443 issued to D. R. Ludwig on Sept. 7, 1965; and 3,987,444 issued to R. J. Masak et al. on Oct. 19, 1976. Since the global and spot coverage beams transmitted from a satellite arrive at the area in the vicinity of and surrounding each spot beam coverage area from the same direction, techniques for separating signals arriving from different directions are not usable.

The problem still remaining in the prior art is to provide a technique which permits communication with receivers disposed within the blackout region formed in the vicinity of and surrounding each spot beam coverage area by the interference between signals in the concurrently transmitted and overlapping spot coverage and global coverage beams which use the same frequency band.

SUMMARY OF THE INVENTION

The present invention relates to method and apparatus for communicating with one or more receiver stations disposed within a blackout region located in the vicinity of and surrounding each spot beam coverage area, the blackout region being caused by interference between concurrently transmitted and overlapping area coverage and spot coverage antenna radiated beams using the same frequency band.

More particularly, this invention relates to method and apparatus for communicating with one or more receiver stations disposed within the above-mentioned blackout region by selectively turning off the associated interfering spot beam during a predetermined interval of time to permit the global beam to communicate with the normally blacked out receivers.

It is an aspect of the present invention to enable communication with receivers disposed within each blackout region by substantially cancelling interference in each blackout region between concurrently transmitted and overlapping area and spot coverage antenna radiated beams by selectively turning off each interfering spot beam during a predetermined interval of time while ensuring that the power level of the radiated global coverage beam within the blackout region substantially corresponds to the power level normally encountered across the majority of the global coverage beam receiving area.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views:

FIG. 5 illustrates a typical transmission sequence for exchanging information between ground stations disposed primarily in a global beam area and each of three spot beam areas and the associated blackout regions in accordance with the present invention.

DETAILED DESCRIPTION

The present invention has been described primarily in relationship to a satellite communication system which concurrently transmits a global coverage satellite radiated beam that ovrlaps one or more spot coverage satellite radiated beams at the associated ground receiver areas. Additionally, the signals in each of the above-mentioned beams occupy the same frequency spectrum and a known technique of channel coding of the signals in the global beam is used primarily to permit separation of the received global and spot beam signals in the area of each spot beam receiver. However, it will be understood that such description is exemplary only and is for the purpose of exposition and not for purpose of limitation. It will be readily appreciated that the inventive concept described can be used in conjunction with other interference reduction techniques and is equally applicable to other radiated wave transmission systems which comprise two or more beams having different destinations but which interfere with one another at one or more of the destinations.

Figure 1:
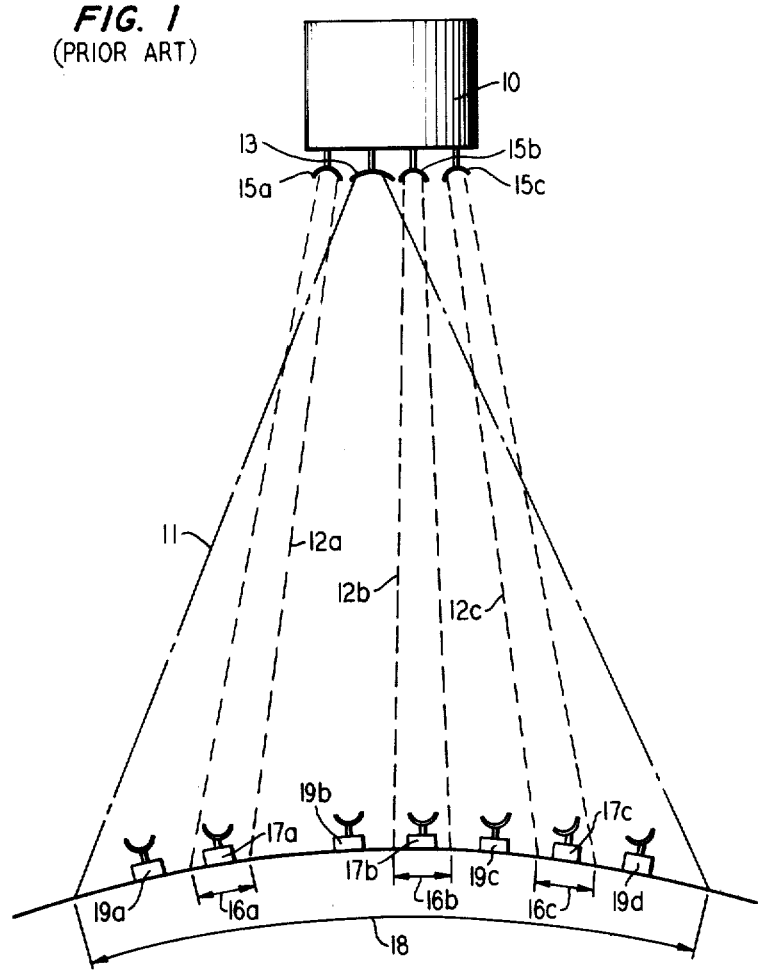
FIG. 1 diagrammatically illustrates a known satellite communication system which provides both an area coverage beam and a plurality of spot coverage beams between the satellite and the associated ground receiver stations.

In FIG. 1 a known satellite communication system is illustrated wherein the present invention can be employed to permit communication with ground receiving stations which were not previously directly accessible by the satellite system as will be described hereinafter. The satellite 10 transmits both a global coverage beam 11 and a plurality of spot coverage beams of which, for example, three beams 12a, 12b, and 12c are shown with all beams comprising signals within same frequency spectrum. Spot coverage beams 12a, 12b, and 12c are shown radiating from antennae 15a, 15b, and 15c, respectively, and directed at respective ground areas 16a, 16b, and 16c which include, for example, one or more high traffic ground stations 17a, 17b, and 17c. Global coverage beam 11 is shown radiating from an antenna 13 and directed at a ground area 18 which includes both the spot beam ground areas 16a, 16b and 16c and a plurality of low traffic ground stations of which, for example, four stations 19a-19d are shown. In the satellite communication system of FIG. 1, satellite 10 communicates with each of the one or more high traffic ground stations 17a, 17b and 17c via a separate spot beam 12a-12c, respectively, while the satellite 10 communicates with low traffic ground stations 19a-19d via the global coverage beam 11.

Figure 2:
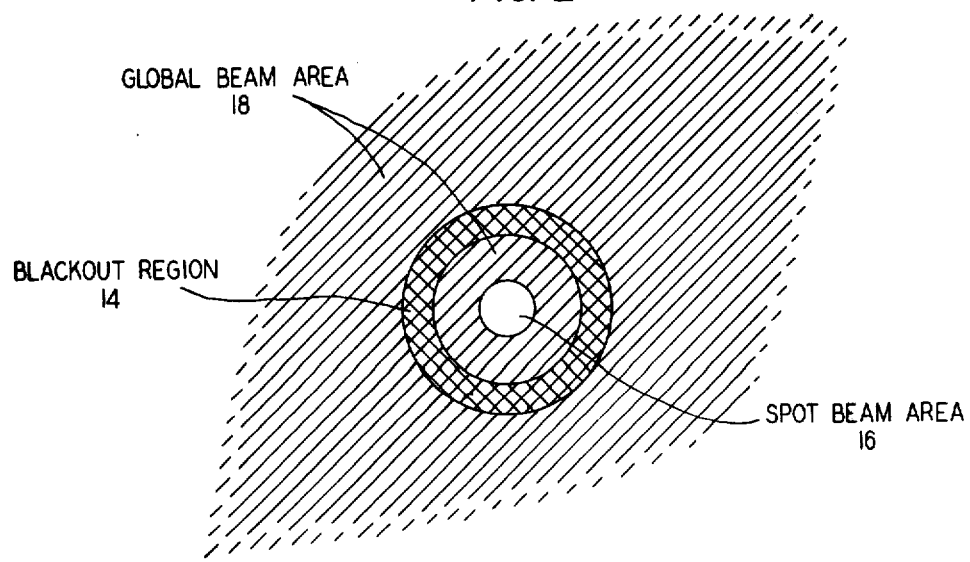
FIG. 2 is an illustrative view of interference patterns caused by an overlapping spot coverage and an area coverage beam in the system of FIG. 1 after application of the prior art interference reduction technique of channel coding.

It can be seen from FIG. 1 that when global coverage beam 11 and spot coverage beams 12a-12c are transmitted concurrently and use the same frequency spectrum, each of ground stations 17a-17c will receive both the associated one of spot coverage beams 12a-12 c and global coverage beam 11 since these beams emmanate from approximately the same point. Under such conditions the use of prior art techniques such as, for example, the transmission of the spot beam digital signal in an uncoded form while concurrently transmitting the global beam digital signal with lower capacity and in a coded form using a forward error correcting code such as, for example, a block or convolutional code can be used to enable separation of the two interfering signals. At the receiver intercepting both digital signals, a suitable detection process such as, for example, a joint likelihood detection process can be performed to separate the two signals and also decode the global beam signal. Although separation of the two siganls can be effected at each spot beam ground station 17 in the associated ground area 16 using the known aforementioned technique of channel coding, such technique and other similar techniques produce a blackout region 14 in the global area 18 in the vicinity and surrounding each spot beam area 16 as shown in FIG. 2. In such blackout regions, signal separation becomes virtually impossible without the use of sophisticated circuitry, and ground stations in the blackout regions in the past usually gain access to the satellite system via terestrial trunks to the nearest global or spot beam ground station.

Figure 3:
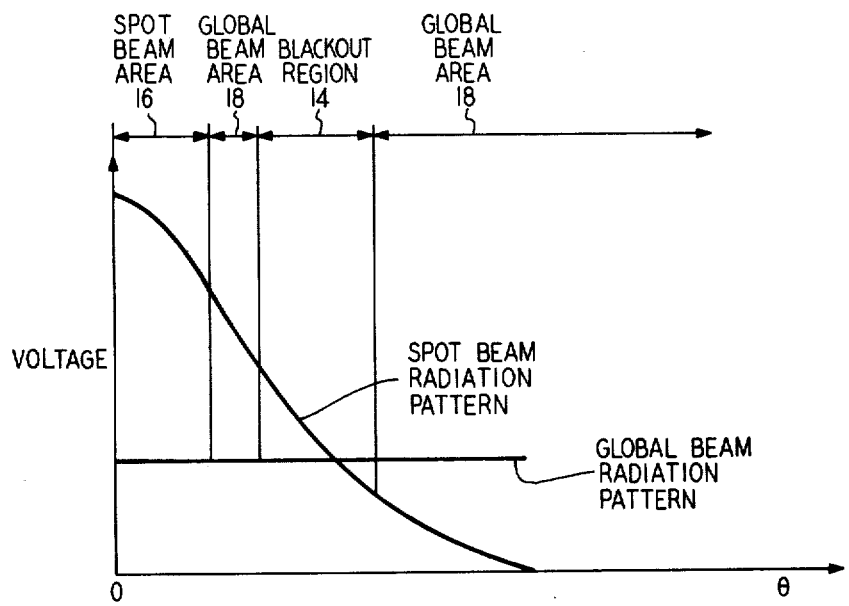
FIG. 3 graphically illustrates the spot and global beam radiation patterns shown in FIG. 2 and their relation to the received voltage and position, the graph including the boundaries for the spot coverage beam, area coverage beam and blackout region for a communication pulse transmitted with channel coding.

FIG. 3 more clearly illustrates the cause of the various areas or regions shown in FIG. 2 relative to the typical radiation pattern of each interfering beam as displayed in a graph of Voltage versus $\theta$, where $\theta$ represents the angle from beam center for a spot coverage beam 12 for the above-mentioned condition where the spot beam signals are transmitted in uncoded form and the global beam signals are transmitted in coded form using a forward error correcting code. Since the radiation pattern of each of the spot and global beams is symmetrical about $\theta =$ only one-half of the curve is depicted. From the Figure it can be seen that the spot beam radiation pattern is of Gaussian shape about $\theta = 0$ and decreases with increasing $\theta$ while the global beam radiation pattern remains substantially the same over the entire range. To understand the causation of the various areas and regions of FIG. 2, it must be understood that absent a spot beam and its associated radiation pattern the coded global beam signals in FIG. 3 are of sufficient strength to be detected and decoded over the entire receiving area 18 of the global beam. In the presence of an uncoded spot beam signal, however, (a) both beams have sufficient strength and separation in the spot beam area 16 to provide good detection capabilities with the outer edge of spot beam area 16 occurring where the signal strength of the spot beam has deteriorated by a certain amount as, for example, 3 dB; (b) between the outer edge of the spot beam area 16 and the inner edge of the blackout region 14 the uncoded spot beam signal has deteriorated by an amount which does not permit good detection of this uncoded signal while the coded global beam signal has sufficient signal strength and separation from the spot beam to permit good detection capabilities of this signal and this area then forms part of the overall global beam area 18; (c) in blackout region 14 the proximity of the signal strength of both signals does not permit good detection of either signal; and (d) beyond the outer edge of the blackout region only the coded global beam signal has good detection properties.

Figure 4:
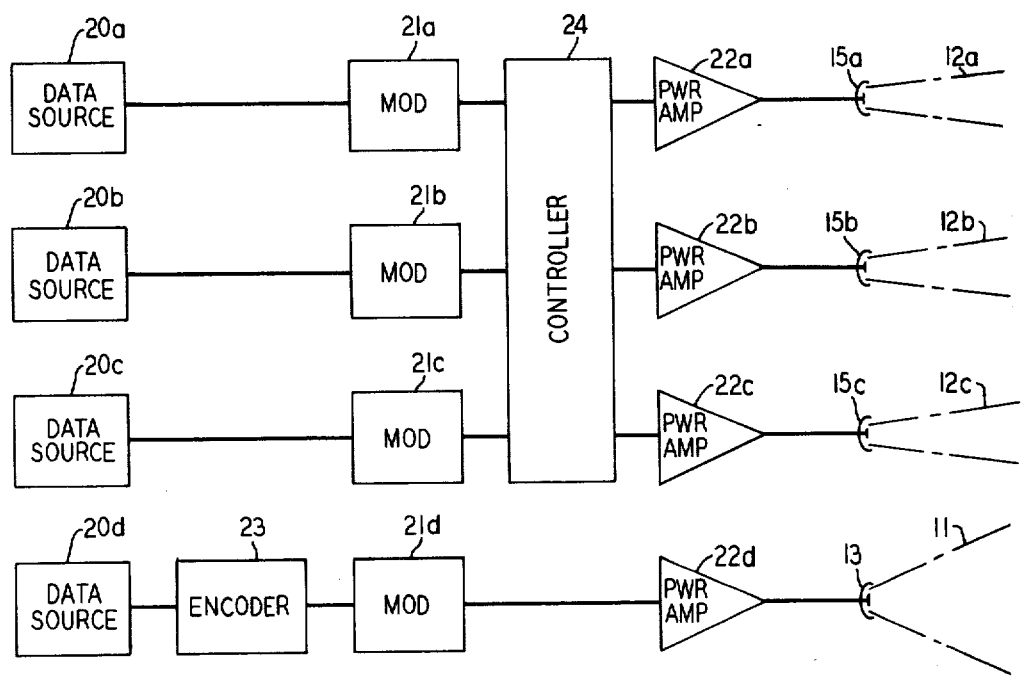
FIG. 4 illustrates an arrangement according to the present invention to effect interference cancellation between an area coverage beam and each of the spot coverage beams in the vicinity of and surrounding each spot beam coverage area.

The transmission of a global coverage beam 11 and a plurality of spot coverage beam 12a-12c which use the same frequency spectrum without causing interference therebetween in the blackout regions disposed in the vicinity of and surrounding each spot beam coverage area 16a-16c can be effected in accordance with the present invention by the typical arrangement shown in FIG. 4. There a separate source of data 20a-20c generates each of the digital signals destined to be transmitted via spot coverage beams 12a-12c, respectively. The digital data signals generated by each of data sources 20a-20c are modulated to the desired frequency spectrum for transmission in separate modulators 21a-21c, respectively. The outputs from the modulators 21a-21c are fed into a controller 24 where each digital data signal from modulators 21a-21c is selectively terminated for a predetermined interval of time by controller 24 to effect interference cancellations between the concurrently transmitted global coverage and spot coverage beams as will become clear in the discussion associated with FIG. 5. The signals passing through controller 24 from data sources 20a-20c are amplified in power amplifiers 22a-22c, respectively, prior to being applied to the respective antennae 15a-15c for transmission via spot coverage beams 12a-12c, respectively. For the previously mentioned example using channel coding, the digital signals to be transmitted via global coverage beam 11 are similarly generated by a data source 20d but at a reduced data rate which can be, for example, approximately one-half the rate of sources 20a-20c. These global beam signals are, however, first encoded in channel encoder 23 using, for example, a forward error correcting code which generates two bits for every bit generated by source 20d prior to being sequentially modulated in modulator 21d, amplified by power amplifier 22d, and transmitted by antenna 13 in global coverage beam 11. In this manner a global coverage beam 11 of lower capacity is provided and redundancy is added using coding at the transmitter such that the transmitted global coverage beam 11 occupies the entire spectral band used by each of the spot coverage beams 12a-12c.

It is to be understood that data sources 20a-20d, modulators 21a-21d, encoder 23, and power amplifiers 22a-22d can comprise any suitable means capable of providing the function described hereinabove. Similarly, controller 24 can comprise any suitable means, such as, for example, a microprocessor switching unit for selectively terminating, for a predetermined period of time each of the digital data signals supplied by data sources 20a-20c.

Interference cancellation, as effected by selectively terminating each of the digital data signals supplied by data sources 20a-20c for a predetermined interval of time, in accordance with the present invention, can be fully appreciated through the use of the prior art method of communication known as time division multiple access (TDMA) as shown in FIG. 5. TDMA is a typical technique utilized in satellite communication systems which employ a plurality of antenna radiated beams. The arrangement shown in FIG. 5 is an illustration of TDMA which routes messages originating within the coverage area of one antenna beam to their destinations in the coverage areas of the same or other beams including the blackout regions in accordance with the present invention.

In FIG. 5, separate communication frame series 25-28 are presented for each of the exemplary three spot beams 12a-12c and the global beam 11, respectively. Each of the communication frame series 25-28 is divided into equal frame durations of F seconds with each frame being subdivided into a predetermined plurality of subframes, which for the aforementioned example of FIG. 1 is four subframes per frame. There, each subframe within a frame is sequentially assigned for transmission in the downlink beam to the associated ground receiving area of signals that previously originated at a different one of the spot beam stations 17a-17c and global beam area 18. For purposes of the discussion of FIG. 5, each subframe assigned to global beam area 18 is considered to be dedicated to the communication of downlink signals which previously originated from one or more of ground stations 19a-19d or blackout regions 14a-14c and has been designated "G" in FIG. 5.

More particularly, the communication frame series 25 for downlink signals in spot beam 12a is shown as sequentially transmitting signals during a majority of each of subframes 1-4 of each frame which previously originated at ground stations 17a-17c and G, respectively, with the sequence being repeated in subsequent frames. Similarly, the communication frame series 26 for downlink signals transmitted in spot beam 12b is shown as sequentially transmitting signals from a different one of the ground stations 17a-17c and G in a majority of each of subframes 1-4 using the same sequence as that for spot beam 12a but displaced by one subframe to the right. Spot beam 12c similarly uses the same seqence shown for spot beam 12b but displaced one subframe to the right and global beam 11 similarly uses the same sequence shown for spot beam 12c but shifted one subframe to the right. In this manner the TDMA concept is implement wherein during corresponding subframes in each series it can be seen that the stations in each of the major ground areas 16a-16c and 18 are concurrently receiving signals during a majority of the subframe which originated at a different one of these major ground areas.

In accordance with the present invention, during a corresponding predetermined time period, designated t, in each subframe of a spot beam communication series, the associated spot beam has its downlink transmission terminated by controller 24, which time period, t is shown hatched in FIG. 5 for each series. In the preferred embodiment shown in FIG. 5, the predetermined time period t, in each of the spot beam communication series 25-27 is offset so that during any instant of time the transmission of no more than one of the spot beams is terminated and each of the spot beams 12a-12c are thereby sequentially turned off. During the predetermined period of time, t, when a particular spot beam 12 is turned off, the global beam 11 is used to transmit downlink signals to the stations within the blackout region 14 associated with the turned off spot beam 12. Therefore, as shown in FIG. 5, during subframe 1 when spot beam 12a is turned off by controller 24 for the time period, t, spot beam 12b is transmitting downlink signals to ground station 17b which previously originated at ground stations 17b; spot beam 12c is transmitting downlink signals to ground station 17c which previously originated at ground station 17c; and global beam 11 is transmitting downlink signals destined for ground stations disposed in blackout region 14a, associated with spot beam receiving area 16a, which previously originated at any one or more of the ground stations disposed in areas 16a, or 18 (which includes blackout regions 14a-14c) and is designated "a" in the Figure. Similarly, in subframe 1 when spot beam 12b is turned off by controller 24 for the time period, t, spot beam 12a is turned on and is transmitting downlink signals to ground station 17a which previously originated at ground station 17a; spot beam 12c is still transmitting downlink signals to ground station 17c which previously originated at ground station 17c; and global beam 11 is now transmitting downlink signals destined for ground stations disposed in blackout region 14b, associated with spot beam receiving area 16b, which previously originated at any one or more of the ground stations disposed in areas 16b, L or 18 (which includes blackout regions 14a-14c) and is designated "b" in the Figure. Next, in subframe 1 when spot beam 12c is turned off by controller 24 for the time period, t, spot beam 12a is still transmitting downlink signals to ground station 17a which previously originated at ground station 17a; spot beam 12b is again turned on and is continuing to transmit downlink signals to ground station 17b which previously originated at ground station 17b; and global beam 11 is now transmitting downlink signals destined for ground stations disposed within blackout region 14c, associated with spot beam receiving area 16c, which previously originated at any one or more of the ground stations disposed in areas 16c, or 18 (which includes blackout regions 14a-14c) and is designated "c" in the figure. Finally, dring the remaining portion of subframe 1, none of the spot beams 12a-12c are turned off by controller 24 and spot beams 12a, 12b, 12c and global beam 11 are transmitting downlink signals to their associated ground receiving stations which previously originated at ground stations in areas 16a, 16b, 16c and 18, respectively. A similar procedure is followed for each of subframes 2-4 with the downlink transmission during the majority portion of each subframe comprising signals which previously originated at the ground stations indicated to complete the TDMA process. Therefore, during each frame period of F seconds all ground stations are shown able to communicate with all other ground stations during at least some portions of the frame. For example, although ground stations 17b and 17c cannot communicate with blackout region 14a during subframe 1 of each frame because the signals previously originated from those stations are at that moment being transmitted in spot beams 12b and 12c, respectively, ground station 17b is able to communicate with blackout region 14a during subframes 2 and 3 and ground station 17c is able to communicate with blackout region 14a during subframes 3 and 4. A similar analogy can be shown for all other ground stations and blackout regions. Additionally, the signals previously originated from the ground stations within a blackout region and destined for one of the spot beam or global beam areas are communicated to the destined area during a portion of the subframe allocated to the "G" downlink signal.

From FIG. 5, it can be seen that in each of communication frame series 25-27, associated with spot beam 12a-12c, respectively, the frame sequence during each F seconds is repeated for the other frames in the same series. For communication frame sequence 28, associated with global beam 11, the frame sequence also repeats itself in the broad description outlined hereinbefore. However, during each of the time periods t, designated a-c in each subframe, when global beam 11 is transmitting downlink signals to blackout regions 14a-14c, respectively, these downlink signals were previously originated at one or more of the same or other ground stations as outlined hereinbefore and may not necessarily be from all or the same originating stations in corresponding subframes of the next subsequent frames.

More particularly, the assignment of downlink signals from one or more of the possible originating ground stations is arbitrary and preferably based on traffic demands between each one of the originating ground stations and the receiving blackout region ground stations. Therefore, where a transmitting ground station has a relatively high traffic demand with a receiving station in a particular one of the blackout regions, that transmitting station may be assigned a portion of each predetermined time period, t, where global beam 11 is used to communicate with that blackout region. On the other hand, a transmitting ground station having a relatively low traffic demand with the receiving ground station in that same blackout region may buffer the information destined thereto and transmit that buffered information at selected intervals, which, for example, could be once every other frame during the period, t, when global beam 11 is assigned to communicate with that blackout region. Therefore, in FIG. 5, it is shown that communication frame series 28 has frame periods which correspond to F seconds and that the overall series is repeated every E frames to thereby accommodate the blackout region schedules as outlined hereinabove. For exemplary purposes F can equal 125 $\mu$sec and E can equal 100 thereby resulting in series 28 being repeated as shown every 12.5 msec.

It can be readily appreciated that other frame lengths and spot beam terminating intervals and sequences can be used. Thus, it is to be understood that such description is exemplary only and is for purpose of exposition and not for purpose of limitation.

In considering the above-described embodiments it should be fully understood that they are simply illustrative of the principles of the invention. Various other modifications and changes may be made by those skilled in the art which will embody the principles of the invention and fall within the spirit and scope thereof. For example, in FIG. 4, utilizing the prior art technique of channel coding, the controller 24 may be placed after the power amplifiers 22a-22c. However, because low power switching is more easily accomplished than high power switching, the location of controller 24 as shown in FIG. 4 is preferred. In addition, the interference suppression technique of antenna pattern shaping, wherein a portion of the global coverage beam signal is coupled into each spot coverage beam signal prior to transmission of each beam to cause substantial interference cancellation of the global beam signal at each spot beam reception area, might have been employed, for example, instead of channel coding.

What is claimed is:

1. A method of effecting communication with a receiver disposed within a blackout region caused by interference between signals in a first and a second antenna radiated beam which use the same frequency spectrum and overlap each other in their respective receiver areas, the method comprising the steps of:
(a) concurrently transmitting the first and the second antenna radiated beams;
(b) selectively terminating transmission of the second beam during a predetermined interval of time while ensuring that the power level of the first beam in the blackout region substantially corresponds to the power level normally encountered across the majority of the first beam; and
(c) concurrent with step (b) transmitting signals in the first antenna radiated beam which are destined for the receiver disposed within the blackout region.

2. The method according to claim 1 wherein at least one of said first and said second antenna radiated beams includes signals which effect substantial reduction of interference between the first beam signals and the second beam signals in the receiver area associated with the second beam.

3. A method of effecting communication with a plurality of receivers disposed within each of a plurality of n blackout regions caused by interference between signals in a first antenna radiated beam and each of a plurality of n second antenna radiated beams which overlap each other in their respective receiver areas and use the same frequency spectrum, the method comprising the steps of:
   (a) concurrently transmitting the first antenna radiated beam and each of the plurality of n second antenna radiated beams; and
   (b) selectively terminating the transmission of each of the plurality of n second antenna radiated beams associated with the blackout region with which communication is desired during a predetermined interval of time, t, while ensuring that the power level of the first antenna radiated beam in the area of said blackout region with which communication is desired substantially corresponds to the power level normally encountered across the majority of said first antenna radiated beam receiving area to permit communication with receivers in each of said selected blackout regions of the plurality of n blackout regions via the signals transmitted in the first antenna radiated beam.

4. The method according to claim 3 wherein in performing step (a) at least one of the first antenna radiated beam and each of the plurality of n second antenna radiated beams are concurrently transmitted including signals which effect substantial reduction of the interference between the first and each of the plurality of n second antenna radiated beams in each receiver area associated with the plurality of n second antenna radiated beams.

5. The method according to claim 3 wherein in performing step (a), concurrently transmitting signals in each of the first and the plurality of n second antenna radiated beams during a predetermined period of time denominating a subframe which comprises information previously generated at remote transmitters disposed in a different one of the receiver areas associated with each of the first antenna radiated beam, which includes the n blackout regions, and each of the plurality of n second antenna radiated beams, and during each subsequent subframe sequentially transmitting in each of said first and plurality of n second antenna radiated beams information previously generated at remote transmitters disposed in a different one of said receiver areas until all areas have been included before repeating the subframe sequence.

6. The method according to claim 5 wherein in performing step (b), selectively terminating the transmission in each of the plurality of n second antenna radiated beams in a predetermined sequence during each of said subframe intervals while transmitting signals in the first antenna radiated beam to the blackout region associated with said selectively terminated second antenna radiated beam which were previously generated at remote transmitters disposed in at least one of said receiver areas associated with said first and said plurality of n second antenna radiated beams.

7. The method according to claim 6 wherein in performing step (b), during each subsequent subframe interval of the subframe sequence, concurrently transmitting in said first antenna radiated beam, to each corresponding blackout region associated with a selectively terminated second antenna radiated beam, signals previously generated in either one of the same and other combination of remote transmitters disposed in the receiver areas associated with the first and plurality of n second antenna radiated beams.

8. Apparatus for effecting communication with a receiver disposed within a blackout region caused by interference between signals in a first and a second antenna radiated beam which use the same frequency spectrum and overlap each other in their respective receiver areas, the apparatus comprising
   a transmitter capable of concurrently transmitting the first and the second antenna radiated beams; and
   means capable of selectively terminating transmission of the second beam during a predetermined interval of time while ensuring that the power level of the first beam in the blackout region substantially corresponds to the power level normally encountered across the majority of the first beam receiving area to permit said transmitter to transmit signals to the blackout region receiver substantially interference free in the first beam.

9. The apparatus according to claim 8 wherein said transmitter comprises means capable of including signals within at least one of said first and said second antenna radiated beams which effect substantial reduction of interference between the first beam and the second beam signals in the receiver area associated with the second beam.

10. Apparatus for effecting communication with a plurality of receivers disposed within each of a plurality of n blackout regions caused by interference between signals in a first antenna radiated beam and each of a plurality of n second antenna radiated beams which overlap each other in their respective receiver areas and use the same frequency spectrum, the apparatus comprising
   a transmitter capable of concurrently transmitting the first antenna radiated beam and each of the plurality of n second antenna radiated beams; and
   means capable of selectively terminating the transmission of each of the plurality of n second antenna radiated beams associated with the blackout region with which communication is desired during a predetermined interval of time, t, while ensuring that the power level of the first antenna radiated beam in the area of said blackout region with which communication is desired substantially corresponds to the power level normally encountered across the majority of said first antenna radiated beam receiving area to permit communication with receivers in each of said selected blackout regions of the plurality of n blackout regions via the signals transmitted in the first antenna radiated beam.

11. The apparatus according to claim 10 wherein said transmitter comprises means capable of including signals within at least one of the first antenna radiated beam and each of the plurality of n second antenna radiated beams which effect substantial reduction of the interference between the first and each of the plurality of n second antenna radiated beams in each receiver area associated with the plurality of n second antenna radiated beams.

12. The apparatus according to claim 10 wherein said transmitter comprises first means capable of concurrently transmitting signals in each of the first and the plurality of n second antenna radiated beams during a predetermined period of time denominating a subframe which comprises information previously generated at remote transmitters disposed in a different one of the receiver areas associated with each of the first antenna radiated beam, which includes the n blackout regions, and the plurality of n second antenna radiated beams, and second means capable of sequentially transmitting in each of said first and said plurality of n second antenna radiated beams signals previously generated at remote transmitters disposed in yet a different one of said receiver areas during each subsequent subframe period until all remote transmitters have been included in the sequence before repeating said subframe sequence.

13. The apparatus according to claim 12 wherein said means capable of selectively terminating the transmission in each of the plurality of n second antenna radiated beams is capable of selectively terminating the second beams in a predetermined sequence during each of said subframe intervals while said transmitter transmits signals in the first antenna radiated beam to receivers disposed in the blackout region associated with the selectively terminated second antenna radiated beams.

14. Apparatus according to claim 13 wherein said signals capable of being transmitted to receivers disposed in the blackout region associated with the selectively terminated second beams during each subsequent subframe interval comprises information previously generated at either one of the same and other combination of remote transmitters disposed in the receiver areas associated with the first and the plurality of n second antenna radiated beams.

* * * * *